(12) United States Patent
Qiu et al.

(10) Patent No.: US 9,312,772 B2
(45) Date of Patent: Apr. 12, 2016

(54) CURRENT LIMITING SCHEME FOR A CONVERTER

(71) Applicant: Intersil Americas LLC, Milpitas, CA (US)

(72) Inventors: Weihong Qiu, San Ramon, CA (US); Ruchi J. Parikh, Mountain View, CA (US); Chun Cheung, Brooklyn, NY (US); Zhixiang Liang, San Ramon, CA (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 495 days.

(21) Appl. No.: 13/850,402

(22) Filed: Mar. 26, 2013

(65) Prior Publication Data

US 2014/0197811 A1 Jul. 17, 2014

Related U.S. Application Data

(60) Provisional application No. 61/753,081, filed on Jan. 16, 2013, provisional application No. 61/774,453, filed on Mar. 7, 2013.

(51) Int. Cl.
| | | |
|---|---|---|
| *G05F 1/00* | (2006.01) | |
| *H02M 3/158* | (2006.01) | |
| *H02M 3/156* | (2006.01) | |
| *H02M 1/32* | (2007.01) | |

(52) U.S. Cl.
CPC ............ *H02M 3/1582* (2013.01); *H02M 3/156* (2013.01); *H02M 1/32* (2013.01)

(58) Field of Classification Search
CPC ...................... H02M 3/156; H02M 2001/0009; H02M 3/1588; H02M 1/38

USPC ......... 323/207, 222, 234, 271, 273, 282–285, 323/287, 288
See application file for complete search history.

(56) References Cited

U.S. PATENT DOCUMENTS

| 5,717,322 | A | 2/1998 | Hawkes et al. | |
|---|---|---|---|---|
| 8,080,987 | B1 * | 12/2011 | Qiu et al. | 323/288 |
| 8,305,061 | B1 * | 11/2012 | Zhang et al. | 323/283 |
| 2013/0083566 | A1 * | 4/2013 | Gaknoki et al. | 363/21.17 |

OTHER PUBLICATIONS

"1.2A High Efficiency Buck-Boost Regulators: ISL9110, ISL9112." Intersil™ Jul. 13, 2012 pp. 1-20 FN7649.2.

* cited by examiner

*Primary Examiner* — Adolf Berhane
*Assistant Examiner* — Afework Demisse
(74) *Attorney, Agent, or Firm* — Gary Stanford; Huffman Law Group, PC (57) ABSTRACT

A modulator configured to control switching of current through an inductor of a converter according to a current limiting scheme while converting an input voltage to an output voltage, which includes a current limit generator and a comparator network. The current limit generator is configured to provide a periodic ramping current limit value based on either the input voltage or the output voltage, an inductance of the inductor, a timing signal, and a predetermined maximum output current of the boost converter. The comparator network is configured to provide a switch control signal to control switching of current through the inductor by comparing a current sense value indicative of a current through the inductor with a lesser of a compensation error value and the periodic ramping current limit value. The converter may be configured as a peak current mode control converter in either boost or buck mode.

20 Claims, 6 Drawing Sheets

CURRENT LIMITING SCHEME FOR A CONVERTER

CROSS-REFERENCE TO RELATED APPLICATIONS

This application claims the benefit of U.S. Provisional Application Ser. No. 61/753,081, filed on Jan. 16, 2013, and U.S. Provisional Application Ser. No. 61/774,453, filed on Mar. 7, 2013, which are both hereby incorporated by reference in their entireties for all intents and purposes.

BRIEF DESCRIPTION OF THE DRAWINGS

The benefits, features, and advantages of the present invention will become better understood with regard to the following description and accompanying drawings, in which.

DETAILED DESCRIPTION

The peak current through an inductor of a converter may be limited to avoid saturation of the inductor. A peak current limiting scheme is typically used for buck converters which generate a regulated output voltage from a higher input voltage. The peak current limiting scheme may naturally avoid inductor saturation since current is limited to a predetermined maximum level, where the maximum level is selected based on the size of the inductor. A valley current limiting scheme is typically used for boost converters which boost the level of an input voltage to generate a higher regulated output voltage. The valley current limiting scheme only uses a valley limit value of the inductor current for pulse-width modulation (PWM) control. The peak current of a valley current limiting scheme, however, is not directly controlled. The actual peak current in the valley current limiting scheme depends upon the valley current limit and the current ripple. Certain conditions using a fixed valley current limit, such as application of a load step, may cause an excessively long on-time of the inductor current resulting in a very large peak current. The large peak may be followed by a relatively short peak, and the large/small peak pattern may repeat for several cycles causing sub-harmonic oscillation.

The valley current limiting scheme may require a larger inductor to avoid saturation during the larger peak values. A large inductor is undesirable since it is physically larger and thus consumes valuable circuit space. Also, larger inductors are more costly. The sub-harmonic oscillation may limit the maximum load current below a desired target level. In a buck-boost configuration, the abnormal current limiting operation may cause false mode transitioning between buck and boost operation resulting in unstable and/or improper operation.

It is desired to achieve a substantially constant peak current limit level and stable operation at the current limit condition, which is particularly advantageous for converters using the valley current limiting scheme. A more stable operation avoids excessive peaks allowing a reduction in the size of the inductor thereby reducing its size and cost. A more stable operation reduces or even substantially eliminates sub-harmonic oscillation enabling a desired output current level to be achieved. A more stable operation reduces false triggering between buck and boost mode in a buck-boost configuration.

Similar problems arise for peak current mode control converters under certain conditions for both buck and boost modes of operation. It is desired to reduce sub-harmonic oscillation enabling a desired output current level to be achieved. A more stable operation also reduces false triggering between buck and boost mode in a buck-boost configuration.

Figure 1:
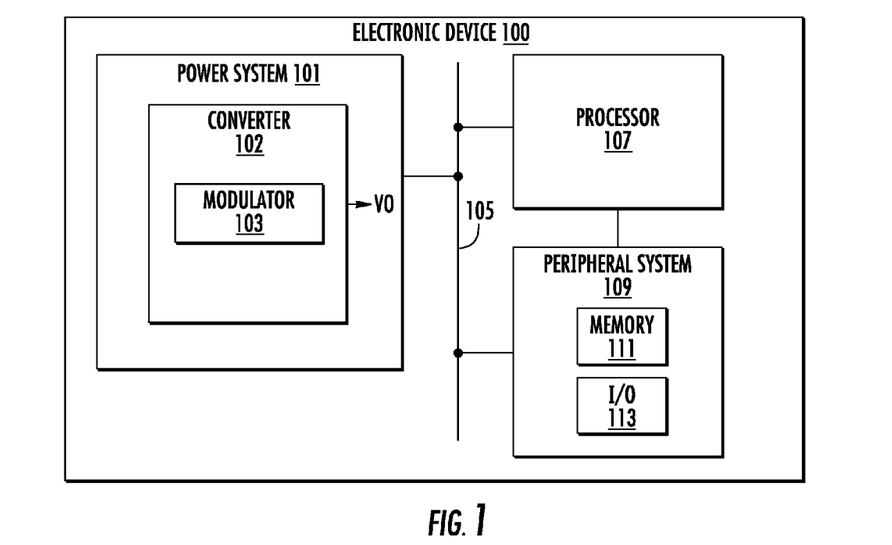
FIG. 1 is a simplified block diagram of an electronic device configured with a power system having a buck-boost converter with a modulator incorporating a current limiting scheme implemented according to one embodiment.

FIG. 1 is a simplified block diagram of an electronic device 100 configured with a power system 101 having a buck-boost converter 102 with a modulator 103 incorporating a current limiting scheme implemented according to one embodiment. The present invention is illustrated using the buck-boost converter 102, although boost converters or buck converters are also contemplated. The power system 101 develops one or more supply voltages which provide power to other system devices of the electronic device 100. As shown, for example, the converter 102 develops an output voltage VO.

In the illustrated embodiment, the electronic device 100 includes a processor 107 and a peripheral system 109, both coupled to receive one or more supply voltages from the power system 101 via a bus 105, which includes any combination of power and/or signal conductors. The bus 105 may distribute the output voltage VO or a version thereof. In the illustrated embodiment, the peripheral system 109 may include any combination of a system memory 111 (e.g., including any combination of RAM and ROM type devices and memory controllers and the like), and an input/output (I/O) system 113, which may include system controllers and the like, such as graphic controllers, interrupt controllers, keyboard and mouse controllers, system storage device controllers (e.g., controllers for hard disk drives and the like), etc. The illustrated system is exemplary only, since many of the processor system and support devices may be integrated onto the processor chip as understood by those skilled in the art.

The electronic device 100 may be any type of computer or computing device, such as a computer system (e.g., notebook computer, desktop computer, netbook computer, tablet computer, etc.), a media tablet device (e.g., iPad by Apple Inc., Kindle by Amazon.com, Inc., etc.), a communication device (e.g., cellular phone, smartphone, etc.), among other type of electronic devices (e.g., media player, recording device, etc.). The power system 101 may be configured to include a battery (rechargeable or non-rechargeable) and/or may be configured to operate with an alternating current (AC) adapter or the like.

Figure 2:
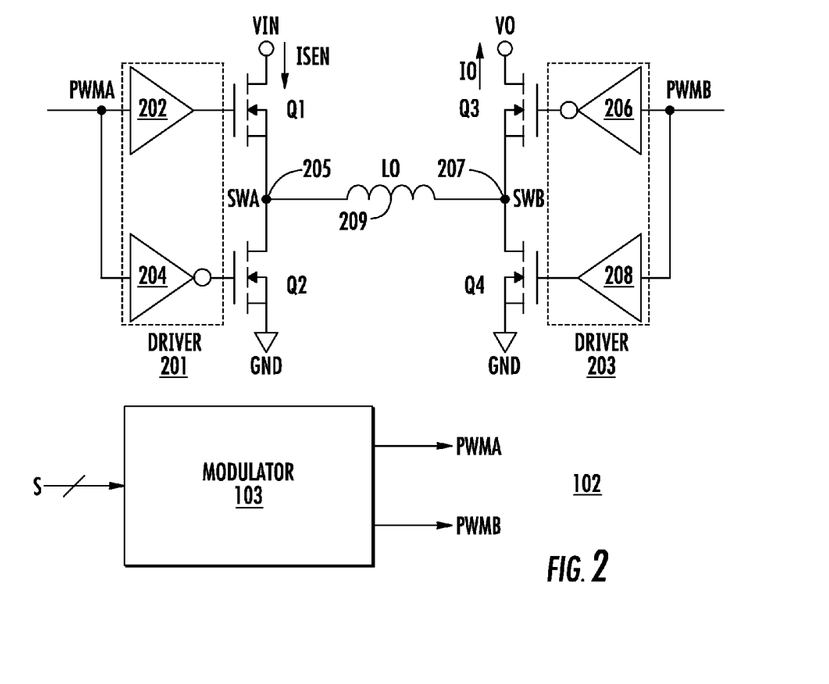
FIG. 2 is a simplified schematic and block diagram of the buck-boost converter of FIG. 1 implemented according to one embodiment.

FIG. 2 is a simplified schematic and block diagram of the buck-boost converter 102 implemented according to one embodiment. An input voltage VIN is provided to a first current terminal of an electronic switch Q1, having a second current terminal coupled to a node 205 developing a first switched voltage SWA. An electronic switch Q2 has a first current terminal coupled to node 205 and a second current terminal coupled to a source voltage reference node, such as ground (GND). The voltage level of GND may be any suitable voltage level, such as positive, negative or zero. The output voltage VO is developed at a first current terminal of an electronic switch Q3, having a second current terminal coupled to a node 207 developing a second switched voltage SWB. An electronic switch Q4 has a first current terminal coupled to node 207 and a second current terminal coupled to GND. An output inductor 209 with inductance LO is coupled between nodes 205 and 207.

A first switch driver 201 has an input receiving a first PWM signal PWMA, a first output coupled to a gate terminal of Q1, and a second output coupled to a gate terminal of Q2. The first switch driver 201 is shown in a simplified manner including a non-inverting buffer amplifier 202 having an input receiving PWMA and an output coupled to the gate of Q1, and including an inverting buffer amplifier 204 having an input receiving PWMA and an output coupled to the gate of Q2. A second switch driver 203 has an input receiving a second PWM signal PWMB, a first output coupled to a gate terminal of Q3, and a second output coupled to a gate terminal of Q4. The second switch driver 203 is also shown in a simplified manner including a non-inverting buffer amplifier 206 having an input receiving PWMB and an output coupled to the gate of Q3, and including an inverting buffer amplifier 208 having an input receiving PWMB and an output coupled to the gate of Q4.

The buck-boost converter 102 includes the modulator 103 which receives one or more sense signals S and develops the PWMA and PWMB signals for controlling voltage conversion. The S signals may include, for example, the input voltage VIN, the output voltage VO or a version thereof (e.g., via a voltage divider or the like), and any one or more signals indicative of one or more current levels in the buck-boost converter 102. In one embodiment, a current ISEN flowing through the current terminals of Q1 is sensed or otherwise derived by the modulator 103 to provide a corresponding voltage $V_{ISEN}$ (FIG. 3) indicative thereof. An output current IO is shown flowing through Q3 from node 207 to the output node developing VO.

In one embodiment, the modulator 103 monitors VIN and VO (directly or indirectly) and switches between a buck mode and a boost mode of operation. VO may be regulated to a predetermined voltage level and VIN may be an unregulated voltage level that varies within a voltage range from below to above the regulated voltage of VO. As a non-limiting example, VIN may be provided from a battery or the like which varies from 1 Volt (V) to 5V, whereas VO is regulated to 3.3V. When VIN is below VO, the modulator 103 operates the converter 102 in boost mode to regulate VO at a higher voltage level than VIN. When VIN is above VO, the modulator 103 operates the converter 102 in buck mode to regulate VO at a lower voltage level than VIN. Although not further described, the modulator 103 may be configured to transition between buck and boost modes in a smooth manner when VIN and VO are about the same to avoid oscillations or significant glitches or deviations of VO.

In one embodiment, when in the buck mode, the modulator 103 asserts PWMB at a fixed low value to turn Q3 on and turn Q4 off so that node 207 is effectively coupled to VO. In the buck mode, the modulator 103 toggles PWMA to regulate VO. When PWMA is high, Q1 is turned on and Q2 is turned off so that VIN is coupled to node 205 to increase current in the inductor 209. At a PWM termination point, such as when ISEN reaches a maximum level or in response to a clock signal or other control condition, Q1 is turned off and then Q2 is turned on for the second phase of the cycle to reduce current in the inductor 209. The modulator 103 monitors one or more operation parameters and toggles PWMA in such a manner to regulate VO within a regulated voltage range as understood by those skilled in the art.

In one embodiment, when in the boost mode, the modulator 103 asserts PWMA at a fixed high value to turn Q1 on and to turn Q2 off so that node 205 is effectively coupled to VIN. In the boost mode, the modulator 103 toggles PWMB to regulate VO. When PWMB is high, Q4 is turned on and Q3 is turned off so that node 207 is coupled to GND to increase current in the inductor 209. At a PWM termination point, such as when ISEN reaches a maximum level or in response to a clock signal or other control condition, Q4 is turned off and then Q3 is turned on for the second phase of the cycle to reduce current in the inductor 209. The modulator 103 monitors one or more operation parameters and toggles PWMB in such a manner to regulate VO within a regulated voltage range as understood by those skilled in the art.

Each of the drivers 201 and 203 are shown in simplified form and may include additional support circuitry for proper operation. For example, the drivers 201 and 203 may include additional circuitry to ensure that only one electronic switch is turned on at a time to avoid temporarily grounding VIN or VO. Furthermore, high side drivers 202 and 206 may include bootstrapping or charge pump circuitry to facilitate driving the gates of Q1 and Q3 above the VIN and VO rails, respectively. The electronic switches Q1-Q4 are each shown as N-channel metal-oxide semiconductor, field-effect transistors (MOSFETs) as known to those skilled in the art. Other types of electronic switching devices may be used, such as other types of FETs and the like, and other types of transistors, such as bipolar junction transistors (BJTs) or insulated-gate bipolar transistors (IGBTs) and the like, etc.

Figure 3:
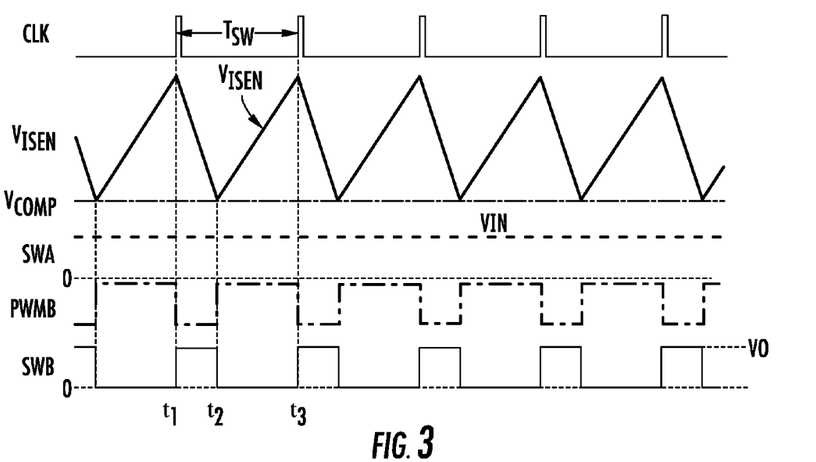
FIG. 3 is a timing diagram illustrating operation of the converter of FIG. 1 in boost mode during a steady state condition with a relatively low output load.

FIG. 3 is a timing diagram illustrating operation of the converter 102 in boost mode during a steady state condition with a relatively low output load. In the illustrated embodiment, the converter 102 operates with a clock signal CLK having a fixed frequency level with a constant switching period $T_{SW}$. The CLK signal is used as a timing signal for the converter 102 as further described herein. CLK may be provided to the modulator 103 from an external source (not shown), may be developed by the modulator 103 based on an external clock, or may be internally generated. $V_{ISEN}$ is a voltage indicating the level of the sensed current ISEN through Q1. $V_{COMP}$ is a compensation voltage at the output of an error amplifier 401 (FIG. 4) described further below. The CLK, $V_{ISEN}$, $V_{COMP}$, SWA, PWMB, and SWB signals or voltage levels are plotted versus time. In boost mode, PWMA is held high so that Q1 remains on which keeps SWA coupled to VIN. When PWMB is high, Q4 is turned on and current through inductor 209 increases as indicated by $V_{ISEN}$ rising. SWB is pulled low to GND while PWMB is high.

At a first time t1, a pulse on CLK causes the modulator 103 to pull PWMB low turning Q4 off and Q3 on. This couples node 207 to VO so that SWB rises to the voltage level of VO (after transition settling). Since VO is at a higher voltage level than VIN, the current through the inductor 209, as indicated by $V_{ISEN}$, decreases at a substantially constant rate. When $V_{ISEN}$ falls to the voltage level of $V_{COMP}$ at time t2, the modulator 103 switches PWMB high again so that $V_{ISEN}$ begins rising again and SWB goes back low. Operation repeats in this manner while the load remains relatively stable.

Figure 4:
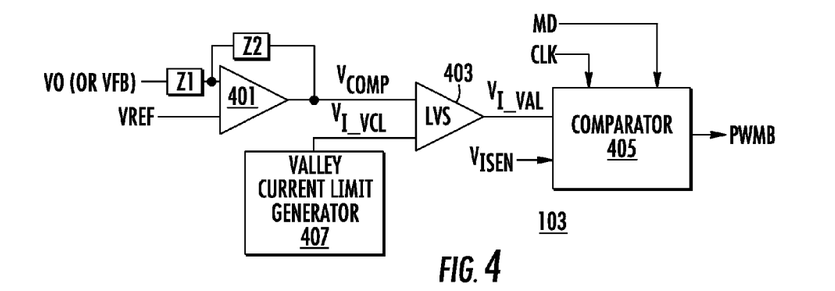
FIG. 4 is a simplified block diagram of a portion of the modulator of FIG. 1 for developing the PWMB pulse control signal of FIG. 2 for the boost mode of operation.

FIG. 4 is a simplified block diagram of a portion of the modulator 103 for developing the PWMB pulse control signal for the boost mode of operation. The output voltage VO, or a feedback signal VFB indicative thereof, is provided through a compensation circuit to an input of the error amplifier 401. VFB may be developed using a voltage divider or the like to provide a representative level of VO. The compensation circuit is shown as impedance blocks Z1 and Z2 (feedback for error amplifier 401) which may include any combination of passive devices, such as resistors and capacitors or the like. A reference voltage VREF is provided to another input of the error amplifier 401, which generates the compensation voltage $V_{COMP}$ at its output. VREF represents a desired or regulated voltage level or range of VO. $V_{COMP}$ generally represents an error level or an amount of deviation of VO from the target operating voltage level or range.

$V_{COMP}$ is provided to one input of a lesser voltage selection (LVS) device 403, which receives a valley current limit voltage $V_{I\_VCL}$ at its other input and which provides a valley current limit voltage $V_{I\_VAL}$ at its output. The valley current limit voltage $V_{I\_VCL}$ is indicative of a valley current limit level $I_{VCL}$. The LVS device 403 selects between $V_{COMP}$ and $V_{I\_VCL}$ and asserts $V_{I\_VAL}$ at the same voltage level as the lesser one of the $V_{COMP}$ and $V_{I\_VCL}$ voltages provided at its inputs. In this manner, $V_{I\_VAL}$ has the same voltage level as $V_{COMP}$ when $V_{COMP}$<(or ≤)$V_{I\_VCL}$, and $V_{I\_VAL}$ has the same voltage level as $V_{I\_VCL}$ when $V_{I\_VCL}$<(or ≤)$V_{COMP}$. A valley current limit generator 407 develops and provides the $V_{I\_VCL}$ voltage.

$V_{I\_VAL}$ and $V_{ISEN}$ are provided to respective inputs of a comparator network 405, which also receives CLK and a mode signal MD. MD is a signal indicative of buck or boost mode. The comparator network 405 operates to compare $V_{I\_VAL}$ with $V_{ISEN}$ to determine when to assert PWMB high, and to assert PWMB low with each assertion of CLK during the boost mode of operation. When MD indicates the buck mode of operation, the comparator network 405 keeps PWMB signal asserted low as previously described.

Figure 5:
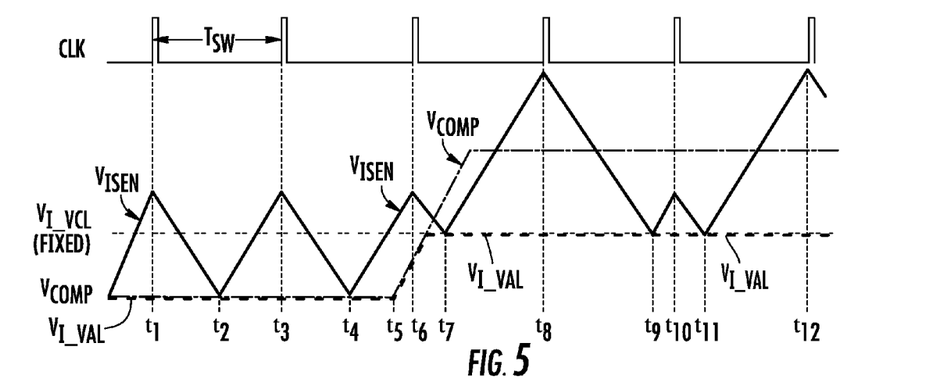
FIG. 5 is a timing diagram illustrating operation of the converter of FIG. 1 in boost mode in response to a step increase of the output load, and with the limiting condition in which $V_{I\_VCL}$, is held at a fixed or constant level.

FIG. 5 is a timing diagram illustrating operation of the converter 102 in boost mode in response to a step increase of the output load, and with the limiting condition in which $V_{I\_VCL}$ is held at a fixed or constant level. The CLK signal and the $V_{ISEN}$, $V_{COMP}$, and $V_{I\_VAL}$ voltages along with a voltage $V_{I\_VCL(FIXED)}$ are plotted versus time, in which the $V_{I\_VCL(FIXED)}$ voltage represents the $V_{I\_VCL}$ signal at the fixed level. The SWA, PWMB, and SWB signals are not shown but operate in a similar manner as previously described. Up to a time t5 (t1-t5), operation is substantially similar to that shown in FIG. 3 while $V_{COMP}$ is less than $V_{I\_VCL(FIXED)}$. During this time, $V_{I\_VAL}$ has the same voltage level as $V_{COMP}$.

As shown beginning at about time t5, a load step is applied at the output which causes a drop of VO and a corresponding rise of $V_{COMP}$ in response. While $V_{COMP}$ remains below $V_{I\_VCL(FIXED)}$, $V_{I\_VAL}$ rises with $V_{COMP}$. At time t6, the next pulse of the CLK occurs and $V_{ISEN}$ begins ramping down. As $V_{ISEN}$ ramps down, $V_{COMP}$ rises above $V_{I\_VCL(FIXED)}$ and $V_{I\_VAL}$ stops rising and instead remains limited to the same voltage level of $V_{I\_VCL(FIXED)}$. $V_{ISEN}$ falls below $V_{COMP}$ which does not cause switching of PWMB until a subsequent time t7 when $V_{ISEN}$ reaches $V_{I\_VAL}$ fixed at $V_{I\_VCL(FIXED)}$. PWMB switches at time t7 and $V_{ISEN}$ begins ramping up and continues to ramp up until the next pulse of CLK at time t8. Since $V_{ISEN}$ begins rising relatively soon in the cycle, it continues to rise for a relatively long time resulting in a relatively high peak level of $V_{ISEN}$ at time t8 before it begins falling again. At time t8, a CLK pulse causes PWMB to switch again so that $V_{ISEN}$ reverses and ramps down all the way to the voltage level of $V_{I\_VCL(FIXED)}$ at a time t9. The long rise time and subsequent fall time of $V_{ISEN}$ results in a relatively large peak current at time t8.

When $V_{ISEN}$ finally falls to $V_{I\_VAL}$ at time t9, it begins ramping up again. The next CLK pulse occurs at time t10 relatively soon after time t9, resulting in a relatively short peak of $V_{ISEN}$ at time t10. $V_{ISEN}$ reverses and ramps down and reaches $V_{I\_VAL}$ at time t11, which is relatively soon after time t10, so that $V_{ISEN}$ reverses again and rises to another high peak level at subsequent time t12. Operation repeats in this manner while $V_{COMP}$ remains above $V_{I\_VCL(FIXED)}$ resulting in a series of alternating very high and very low peaks of $V_{ISEN}$.

The relatively large peaks of current and the pattern of alternating high/low peaks of current through the inductor 209 are undesirable for various reasons. This phenomenon is known in the art as sub-harmonic oscillation and happens at lower than 50% duty cycle for valley current controlled current mode converters. The potential of large peaks may require a larger inductor to avoid saturation of the inductor. A large inductor is undesirable since it is physically larger and thus consumes valuable circuit space. Also, larger inductors are more costly. Each high/low peak pair and the repeating pattern thereof results in sub-harmonic oscillations which may reduce the maximum load current achievable to below a desired level. In the buck-boost configuration, the abnormal current limiting operation may cause false mode transitioning between buck and boost operation resulting in unstable and/or improper operation.

It is desired instead to achieve a substantially constant peak current limit level and stable operation at the current limiting condition. A more stable operation, which may be achieved by the utilization of a compensating ramp signal either added to the current sense signal, or deducted from the $V_{COMP}$ signal (as it is known in the art), avoids sub-harmonic oscillation and the corresponding excessive peaks allowing a reduction in the size of the inductor 209 which further reduces cost. A more stable operation avoids sub-harmonic oscillation allowing a higher output current level. A more stable operation avoids false triggering between buck and boost mode in a buck-boost configuration.

For a boost converter, including the buck-boost converter 102 operating in boost mode, the relationship between the average input current ISEN (as indicated by $V_{ISEN}$) and the output current IO depends on the duty cycle of the PWM signal, such as PWMB, according to the following equation (1):

$$IO = ISEN \cdot (1-D) \quad (1)$$

The average input current ISEN in the boost mode may be determined as a peak current $I_{PEAK}$ of the inductor 209 less one-half of the peak-to-peak ripple current $I_{P\_P\_RIPPLE}$ of the ripple current through the inductor 209 (cause by switching) according to the following equation (2):

$$ISEN = I_{PEAK} - 0.5 \cdot I_{P\_P\_RIPPLE} \quad (2)$$

Thus, the output current IO may be re-written by substituting equation (2) into equation (1) as shown by the following equation (3):

$$IO = (I_{PEAK} - 0.5 \cdot I_{P\_P\_RIPPLE}) \cdot (1-D) \quad (3)$$

In order to achieve over-current protection, the output current IO should be limited to a predetermined maximum value $IO_{MAX}$. In order to limit the output current to $IO_{MAX}$, the peak current $I_{PEAK}$ of the inductor 209 is limited to a maximum peak current level, $I_{PEAKM}$, determined according to the following equation (4):

$$I_{PEAKM} = \frac{IO_{MAX}}{(1-D)} + 0.5 \cdot I_{P\_P\_RIPPLE} \quad (4)$$

For a boost converter, including the buck-boost converter 102 operating in boost mode, the relationship between the duty cycle, the input voltage VIN and the output voltage VO may be determined according to the following equation (5):

$$1 - D = \frac{VIN}{VO} \quad (5)$$

Thus, the peak current limit level $I_{PEAKM}$ based on equations (4) and (5) may be determined according to the following equation (6):

$$I_{PEAKM} = \frac{VO}{VIN} \cdot IO_{MAX} + 0.5 \cdot I_{P\_P\_RIPPLE} \quad (6)$$

Figure 6:
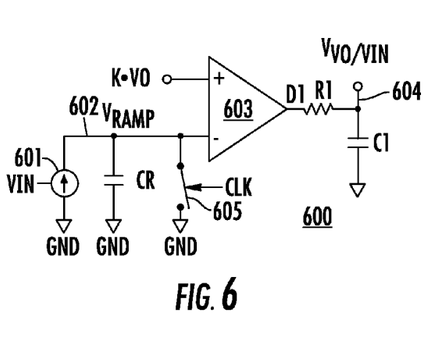
FIG. 6 is a schematic diagram of a ratio conversion network which may be used to develop a voltage indicative of the ratio of output voltage to input voltage.

FIG. 6 is a schematic diagram of a ratio conversion network 600 which may be used to develop a voltage $V_{VO/VIN}$ indicative of the ratio of VO/VIN. The input voltage VIN controls a current source 601 which provides current proportional to VIN to a node 602 coupled to the negative (or inverting) input of a comparator 603. Node 602 develops a ramp voltage $V_{RAMP}$. A capacitor CR is coupled between node 602 and GND. A single-pole, single-throw (SPST) switch 605 has its terminals coupled between node 603 and GND and receives the clock signal CLK at its control input. The output voltage VO modified by a gain value "K" (K·VO) is provided to the positive (non-inverting) input of the comparator 603. It is noted that K·VO may be the feedback voltage VFB representing the voltage level of VO. The comparator 603 outputs a signal D1 provided to a first terminal of a resistor R1, having its other terminal coupled to a node 604. A capacitor C1 is coupled between node 604 and GND. Node 604 develops the voltage $V_{VO/VIN}$ indicative of the ratio of VO/VIN.

Figure 7:
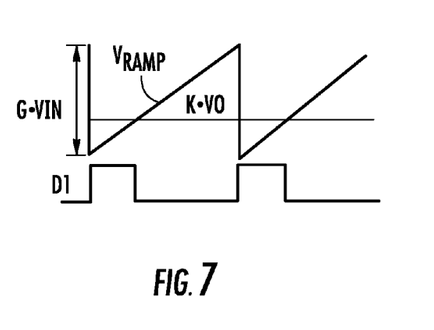
FIG. 7 is a timing diagram illustrating operation of the ratio conversion circuit of FIG. 6.

FIG. 7 is a timing diagram illustrating operation of the ratio conversion circuit 600. When CLK is pulsed high, the switch 605 is momentarily closed discharging the capacitor CR pulling the ramp voltage $V_{RAMP}$ low (e.g., to GND). When the switch 605 is opened, the capacitor CR is charged by the current source 601 so that $V_{RAMP}$ ramps up at a rate based on the input voltage VIN. When CLK next pulses again, the ramp voltage $V_{RAMP}$ is again reset low and operation repeats in this manner in which $V_{RAMP}$ ramps between GND and a peak value G·VIN in which "G" is a gain value. Each time $V_{RAMP}$ resets low, the comparator 603 asserts D1 high. When $V_{RAMP}$ reaches the voltage level of K·VO, the comparator 603 asserts D1 low for the remainder of the cycle. D1 is thus a signal having a duty cycle proportional to the ratio of VO/VIN. R1 and C1 collectively form a resistor-capacitor (RC) filter which averages the value of D1 to develop the voltage $V_{VO/VIN}$ indicative of the ratio VO/VIN.

For a boost converter, including the buck-boost converter 102 operating in boost mode, the peak-to-peak ripple current $I_{P\_P\_RIPPLE}$ of the inductor 209 may be determined according to the following equation (7):

$$I_{P\_P\_RIPPLE} = \frac{D \cdot VIN}{LO} \cdot T_{SW} \quad (7)$$

where D is the duty cycle and $T_{SW}$ is the switching period of PWMB, and where LO is the inductance of the inductor 209.

Figure 8:
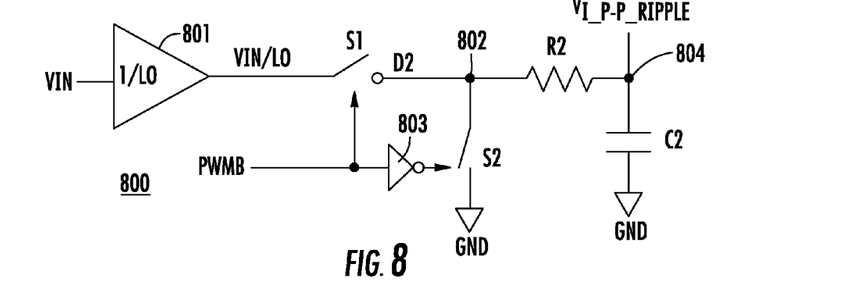
FIG. 8 is a schematic diagram of a ripple conversion network which may be used to develop a voltage indicative of peak-to-peak ripple current through the inductor of the converter of FIG. 2.

FIG. 8 is a schematic diagram of a ripple conversion network 800 which may be used to develop a voltage $V_{I\_P\_P\_RIPPLE}$ indicative of $I_{P\_P\_RIPPLE}$ according to equation (7). The input voltage VIN is provided to the input of an amplifier 801 having a gain value 1/LO which is the equivalent to the inverse of the inductance LO of the inductor LO. The output of the amplifier 801 asserts a voltage indicative of VIN/LO which is provided to one switch terminal of a SPST switch S1, having its other switch terminal coupled to a node 802 and having a control input receiving PWMB. PWMB is inverted by an inverter 803 and provided to the control input of another SPST switch S2, which has one switch terminal coupled to node 802 and its other switch terminal coupled to GND. Node 802 develops a duty cycle signal D2, which is provided to one end of a resistor R2, having its other end coupled to a node 804. A capacitor C2 is coupled between node 804 and GND. R2 and C2 collectively form an RC filter which averages the voltage of node 802.

The function of S1 and S2 as controlled by PWMB effectively toggles the value VIN/LO from the amplifier 801 based on the value $D \cdot T_{SW}$ of PWMB to form the duty cycle signal D2 based on the results of the equation (7). The RC filter averages the voltage of D2 so that 804 develops the voltage $V_{I\_P\_P\_RIPPLE}$ which is indicative of the current $I_{P\_P\_RIPPLE}$ according to equation (7).

Figure 9:
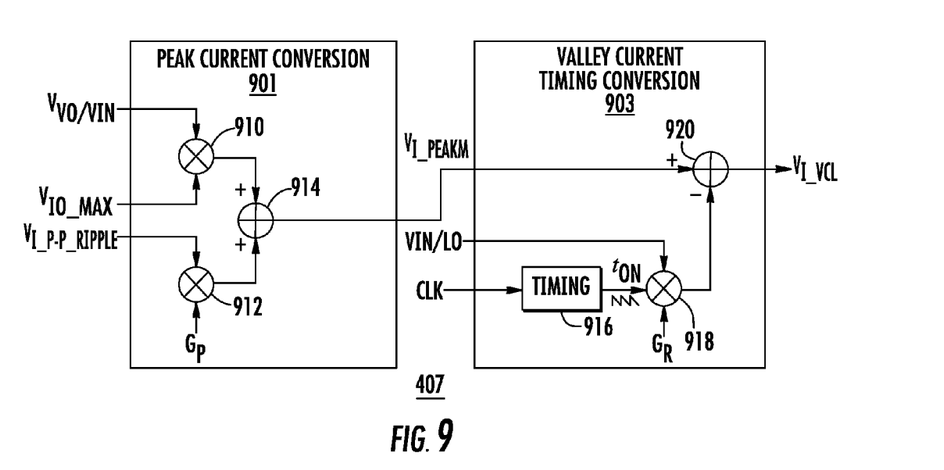
FIG. 9 is a simplified block diagram of the valley current limit generator of FIG. 4 according to an exemplary embodiment for developing a valley current limit voltage indicative of a valley current limit level.

FIG. 9 is a simplified block diagram of the valley current limit generator 407 according to an exemplary embodiment for developing the $V_{I\_VCL}$ voltage. In this case, the $V_{I\_VCL}$ voltage is not fixed but is varied to modify operation of the modulator 103 to achieve a substantially constant peak current limit level and stable operation at the current limiting condition. The valley current limit generator 407 includes a peak current conversion network 901 and a valley current timing conversion network 903.

The peak current conversion network 901 develops a voltage $V_{I\_PEAKM}$ indicative of the peak current limit level $I_{PEAKM}$ according to equation (6). The peak current conversion network 901 receives $V_{VO/VIN}$ developed by the ratio conversion network 600 and also receives a voltage $V_{IO\_MAX}$ having a level indicative of the predetermined maximum value $IO_{MAX}$. In one embodiment, the peak current conversion network 901 combines these values together with the appropriate gain value to obtain the first part of the $I_{PEAKM}$ value according to equation (6). As shown, a combiner 910 (e.g., multiplier) multiplies $V_{VO/VIN}$ and $V_{IO\_MAX}$. Although not shown, the result may incorporate a suitable gain value. The voltage $V_{I\_P-P\_RIPPLE}$ is also provided to an input of the peak current conversion network 901, which multiplies $V_{I\_P-P\_RIPPLE}$ by an appropriate gain value, e.g., $G_P$, to obtain the second part of the $I_{PEAKM}$ value according to equation (6). As shown, another combiner 912 multiplies $V_{I\_P-P\_RIPPLE}$ by $G_P$ (in which GP may include the 0.5 factor shown in equation (6)). The peak current conversion network 901 adds the two values together to provide the $V_{I\_PEAKM}$ voltage at its output indicative of the peak current limit level $I_{PEAKM}$. As shown, another combiner 914 (e.g., adder) adds the outputs of the combiners 910 and 912 to develop the $V_{I\_PEAKM}$ voltage at its output.

The valley current timing conversion network 903 receives the $V_{I\_PEAKM}$ voltage, the voltage VIN/LO (e.g., from the output of the amplifier 801 or a version thereof), and the CLK signal to develop the valley current limit voltage $V_{I\_VCL}$ at its output. As previously described, the valley current limit voltage $V_{I\_VCL}$ is provided to an input of the LVS device 403 for developing the valley voltage $V_{I\_VAL}$ having a voltage level which is the lesser of $V_{COMP}$ and $V_{I\_VCL}$.

For a boost converter, including the buck-boost converter 102 operating in boost mode, the up slew rate di/dt of the inductor current during the on-time of the Q4 switch (as indicated by $V_{ISEN}$) depends upon the input voltage VIN and the inductance LO of the inductor 209 according to the following equation (8):

$$\frac{di}{dt} = \frac{VIN}{LO} \qquad (8)$$

It has been determined that the valley current limit level $I_{VCL}$ should be adjusted based on the slew rate of the inductor current and limited by the maximum peak current level $I_{PEAKM}$. Thus, the valley current limit level $I_{VCL}$ may be determined according to the following equation (9):

$$I_{VCL} = I_{PEAKM} - \frac{di}{dt} t_{ON} \qquad (9)$$

where "$t_{ON}$" may be considered as the on-time between pulses of the CLK signal. The value $t_{ON}$ may be determined as the CLK period $T_{SW}$ adjusted by time "t" which elapses from 0 to $T_{SW}$ during each CLK period, or $t_{ON}=T_{SW}-t$. In this case, $t_{ON}$ is a periodic ramp signal which ramps from $T_{SW}$ to 0 for each cycle of CLK. In this manner, based on equations (8) and (9) and substituting for $t_{ON}$, the valley current limit level $I_{VCL}$ may be determined according to the following equation (10):

$$I_{VCL} = I_{PEAKM} - \frac{VIN}{LO}(T_{SW} - t) \qquad (10)$$

for time t ranging from 0 to $T_{SW}$ for each period of the CLK. Persons of ordinary skill in the art recognize this waveform as a version of a compensating ramp signal resulting in stable (sub-harmonic free) current limit operation. As previously noted, the maximum peak current level $I_{PEAKM}$ is indicated by the $V_{I\_PEAKM}$ voltage provided by the peak current conversion network 901. Thus, equation (10) may be re-written as the following equation (11):

$$V_{I\_VCL} = V_{I\_PEAKM} - \frac{VIN}{LO}(T_{SW} - t)G_R \qquad (11)$$

where $G_R$ is an appropriate resistive gain value. The valley current timing conversion network 903 receives the $V_{I\_PEAKM}$ voltage, the voltage VIN/LO, and the CLK signal to develop the valley current limit voltage $V_{I\_VCL}$ at its output according to equation (11).

In one embodiment as shown, for example, CLK is provided to a timing block 916 which generates a ramp signal corresponding to the term $G_R(T_{SW}-t)$ in equation (11). The output of the timing block 916 provides the ramp signal to an input of a combiner 918 (e.g., multiplier) which multiplies it by $G_R$ and by VIN/LO to obtain the second term of equation (11) provided to one input of another combiner 920 (e.g., adder). The $V_{I\_PEAKM}$ voltage is provided to another input of the combiner 920, which subtracts the output of the combiner 918 from $V_{I\_PEAKM}$ to provide $V_{I\_VCL}$ at its output.

Figure 10:
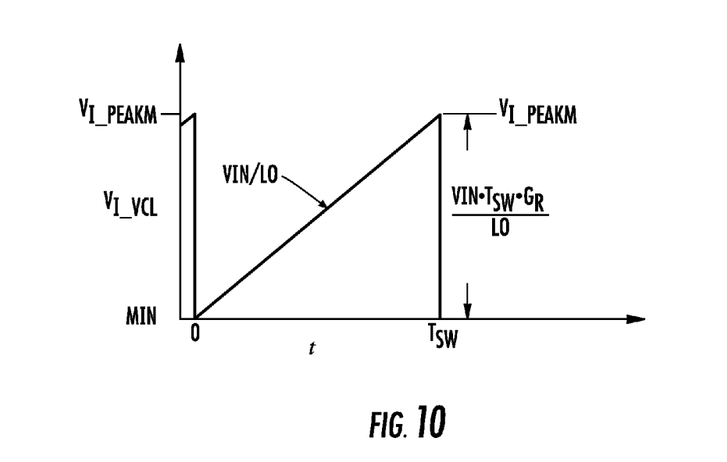
FIG. 10 is a timing diagram plotting a cycle of the valley current limit voltage versus time for a given switching cycle of a clock.

FIG. 10 is a timing diagram plotting a cycle of $V_{I\_VCL}$ versus time t from 0 to $T_{SW}$. When CLK pulses, time t is reset to 0 so that $V_{I\_VCL}$ begins each cycle at a minimum value MIN=$V_{I\_PEAKM}-(VIN\cdot T_{SW}\cdot G_R)$/LO. As time t elapses towards $T_{SW}$, the second term diminishes and $V_{I\_VCL}$ ramps up towards $V_{I\_PEAKM}$. When $t=T_{SW}$, the second term is zero, and $V_{I\_VCL}$ becomes substantially equal to the $V_{I\_PEAKM}$ voltage. The next pulse of CLK resets $V_{I\_VCL}$ back to MIN and the operation repeats. It is noted that MIN may not be a fixed value but instead may vary with adjustments of the $V_{I\_PEAKM}$ voltage and with variations of VIN.

Figure 11:
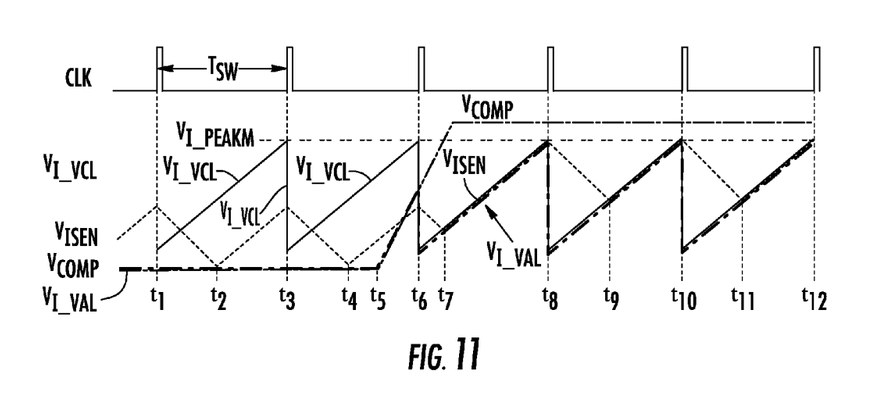
FIG. 11 is a timing diagram illustrating operation of the converter of FIG. 2 in boost mode in response to a step increase of the output load and with the valley current limit voltage asserted by valley current limit generator of FIG. 4 substantially in accordance with equation (11)

FIG. 11 is a timing diagram similar to FIG. 5 illustrating operation of the converter 102 in boost mode in response to a step increase of the output load and with $V_{I\_VCL}$ asserted by valley current limit generator 407 substantially in accordance with equation (11). The CLK signal and the $V_{I\_VCL}$, $V_{ISEN}$, $V_{COMP}$ and $V_{I\_VAL}$ voltages are plotted versus time. $V_{I\_VCL}$ is shown having a repeating form between CLK cycles similar to that shown in FIG. 10 rather than the fixed form (e.g., $V_{I\_VCL(FIXED)}$) as shown in FIG. 5. Operation is similar up to time t5 while $V_{COMP}$ remains below $V_{I\_VCL}$ in which $V_{I\_VAL}$ tracks $V_{COMP}$. When $V_{COMP}$ increases in response to the load step at time t5, $V_{I\_VAL}$ continues to track $V_{COMP}$ until it intersects $V_{I\_VCL}$ at about time t6. At time t6, a pulse of the CLK signal causes $V_{I\_VCL}$ to reset low while $V_{COMP}$ continues to rise. Thus, $V_{I\_VAL}$ switches to tracking $V_{I\_VCL}$ and continues doing so while $V_{I\_VCL}$ is less than $V_{COMP}$. For the remaining cycles shown, $V_{I\_VAL}$ maintains the repetitive ramping voltage of $V_{I\_VCL}$.

At time t6 in response to the pulse of CLK, $V_{ISEN}$ begins ramping back down in a similar manner as shown in FIG. 5. In this case, however, $V_{ISEN}$ intersects $V_{I\_VAL}$ at time t7 after $V_{I\_VAL}$ begins ramping up after time t6. $V_{ISEN}$ then essentially tracks $V_{I\_VAL}$ for the remainder of the cycle up to time t8, in which both $V_{ISEN}$ and $V_{I\_VAL}$ reach substantially the same peak level of $V_{I\_PEAKM}$ shown less than $V_{COMP}$. At time t8, $V_{I\_VAL}$ resets back to the minimum value of $V_{I\_VCL}$ and then begins ramping back up, whereas $V_{ISEN}$ begins ramping down. $V_{ISEN}$ intersects $V_{I\_VAL}$ at time t9 and then both ramp back up to about $V_{I\_PEAKM}$ at time t10. Operation repeats in this manner while $V_{I\_VAL}$ remains less than $V_{COMP}$.

It is noted that the peak current level through the inductor 209 is limited at about $I_{PEAKM}$ as shown in FIG. 11, which is less than the peak value obtained with a fixed value of $V_{I\_VCL}$, or $V_{I\_VCL(FIXED)}$ as shown in FIG. 5. The $I_{PEAKM}$ is a predetermined value based on limiting the output current as previously described, so that the inductor 209 may be implemented with a suitable smaller physical size and lower cost while still enabling the desired output current to be achieved while avoiding saturation during operation. Furthermore, a relatively constant peak current limit level is achieved so that operation is stable without sub-harmonic oscillation. The stable operation avoids false triggering between buck and boost mode in a buck-boost configuration.

A current limit scheme as described herein is also applicable to any type of peak current mode control converters, including buck converters, boost converters and buck-boost converters employing peak current mode control. In peak current mode control, a power switch is turned on at each clock pulse and turned off when the peak current reaches the error amplifier output $V_{COMP}$ or a peak current limit voltage $V_{I\_LIMIT}$ indicative of an inductor current limit $I_{LIMIT}$. Peak current mode controlled converters exhibit sub-harmonic oscillation at duty cycles above 50%. This can be avoided by adding a compensating ramp signal to the current sense waveform (or deducting it from $V_{COMP}$ or from the current limit threshold voltage). As noted above, in the context of the valley current controlled boost converter, sub-harmonic oscillation in current limit is undesirable. However, the application of the compensating ramp, while useful to eliminate sub-harmonic oscillation, reduces the peak current value compared to the desired peak current value. It is desired to generate a modified peak current limit value that results in a substantially constant stable peak current limit at a designed value in peak current controlled converters that include compensating ramp.

Figure 12:
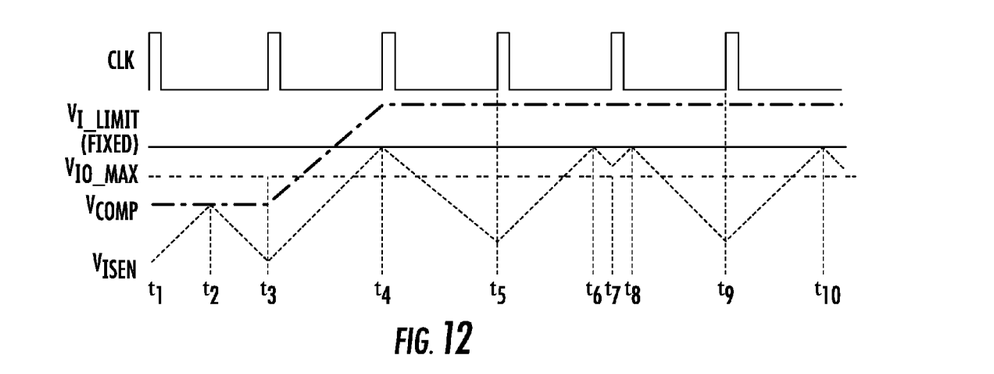
FIG. 12 is a timing diagram illustrating operation of the converter of FIG. 2 configured as a peak current mode control converter and while operating in buck mode in response to a step increase of the output load with a constant current limit value.

FIG. 12 is a timing diagram illustrating operation of the converter 102 configured as a peak current mode control converter and while operating in buck mode in response to a step increase of the output load with a constant current limit value $V_{I\_LIMIT(FIXED)}$. The CLK signal and the $V_{I\_LIMIT(FIXED)}$, $V_{IO\_MAX}$, $V_{COMP}$, and $V_{ISEN}$ voltages are plotted versus time, in which the $V_{I\_LIMIT(FIXED)}$ voltage represents the $I_{LIMIT}$ current limit signal at a fixed current limit level. $V_{ISEN}$ rises in response to a CLK pulse at time t1 until it reaches $V_{COMP}$ at time t2, and then $V_{ISEN}$ falls until the next clock pulse at time t3. Also at about time t3, a load step is applied at the output which causes a drop of VO and a corresponding rise of $V_{COMP}$ in response. $V_{COMP}$ rises above the $V_{I\_LIMIT(FIXED)}$ voltage. $V_{ISEN}$ again rises after time t3 and does not intersect $V_{COMP}$ during the remainder of the cycle since $V_{COMP}$ has risen above the $V_{I\_LIMIT(FIXED)}$ voltage. Instead, $V_{ISEN}$ reaches $V_{I\_LIMIT(FIXED)}$ at a time t4 and then decreases after time t4 even though the next CLK pulse has occurred. $V_{ISEN}$ decreases until the next pulse of CLK at time t5, and then rises until it intersects the $V_{I\_LIMIT(FIXED)}$ voltage at time t6 late in the cycle. $V_{ISEN}$ falls after time t6 but only until the next pulse of CLK at time t7 shortly thereafter. $V_{ISEN}$ rises again but quickly intersects the $V_{I\_LIMIT(FIXED)}$ voltage at time t8 and then decreases for the remainder of the cycle. Operation continues as shown at times t9 and t10.

FIG. 12 illustrates additional problems that may result using a constant current limit value (the $V_{I\_LIMIT(FIXED)}$ voltage). When the duty cycle rises above about 50%, the fixed current limit value may result in sub-harmonic oscillation with one longer pulse followed by one shorter pulse such as shown between times t5 and t9. This also results in the average output current being lower than desired.

Figure 13:
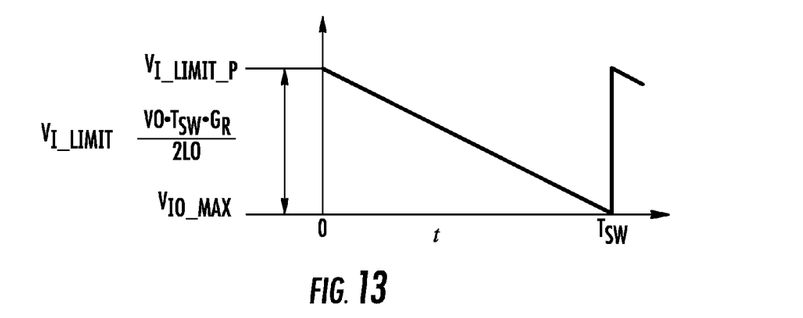
FIG. 13 is a timing diagram illustrating one cycle of a current limit voltage that incorporates a ramp signal and that may be used to overcome the issues of a fixed current limit level of the converter of FIG. 2 configured as a peak current mode control converter and while operating in buck mode.

FIG. 13 is a timing diagram illustrating one cycle of a current limit voltage $V_{I\_LIMIT}$ that incorporates a compensating ramp signal and that may be used to overcome sub-harmonic oscillation of the converter 102 configured as a peak current mode control converter and while operating in buck mode. The minimum value of $V_{I\_LIMIT}$ is $V_{IO\_MAX}$, which is a voltage indicative of the desired maximum output current. The inductor current ripple with D~0 is about $VO \cdot T_{SW}/LO$, and a peak level $V_{I\_LIMIT\_P}$ of $V_{I\_LIMIT}$ is determined according to the following equation (12):

$$V_{I\_LIMIT\_P} = V_{IO\_MAX} + \frac{VO \cdot T_{SW} \cdot G_R}{2 \cdot LO} \quad (12)$$

in which the ramp value is half of the slew rate of the sensed inductor current during PWM=0. The ramp value during each cycle may be developed in a similar manner previously described, in which $T_{SW}$ is replaced by $T_{SW}-t$ in which time "t" elapses from 0 to $T_{SW}$ during each CLK period cycle.

Figure 14:
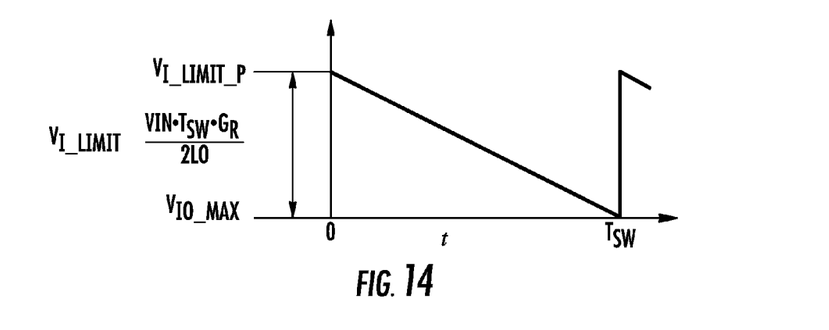
FIG. 14 is a timing diagram illustrating one cycle of a current limit voltage that incorporates a ramp signal and that may be used to overcome the issues of a fixed current limit level of the converter of FIG. 2 configured as a peak current mode control converter and while operating in boost mode.

FIG. 14 is a timing diagram illustrating one cycle of a current limit voltage $V_{I\_LIMIT}$ that incorporates a ramp signal and that may be used to overcome the issues of a fixed current limit level of the converter 102 configured as a peak current mode control converter and while operating in boost mode. The current limit voltage $V_{I\_LIMIT}$ for boost operation is substantially similar except based on the input voltage VIN rather than the output voltage VO. Again, the minimum value of $V_{I\_LIMIT}$ is $V_{IO\_MAX}$, which is a voltage indicative of the desired maximum output current during boost mode. The inductor current ripple with D~1 is about $VIN \cdot T_{SW}/LO$, and a peak level $V_{I\_LIMIT\_P}$ of $V_{I\_LIMIT}$ is determined according to the following equation (13):

$$V_{I\_LIMIT\_P} = V_{IO\_MAX} + \frac{VIN \cdot T_{SW} \cdot G_R}{2 \cdot LO} \quad (13)$$

in which the ramp value is half of the slew rate of the sensed inductor current during PWM=1. Again, the ramp value during each cycle may be developed in a similar manner previously described, in which $T_{SW}$ is replaced by $T_{SW}-t$ in which time "t" elapses from 0 to $T_{SW}$ during each CLK period cycle.

Figure 15:
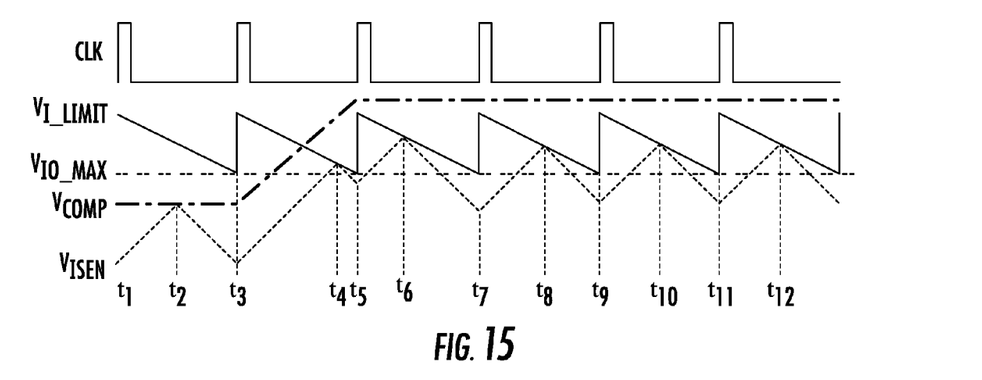
FIG. 15 is a timing diagram illustrating operation of the converter of FIG. 2 configured as a peak current mode control converter and operating in either buck or boost mode in response to a step increase of the output load with a current limit level substantially in accordance with either equation (12) in buck mode or equation (13) in boost mode.

FIG. 15 is a timing diagram similar to FIG. 12 illustrating operation of the converter 102 configured as a peak current mode control converter and operating in either buck or boost mode in response to a step increase of the output load at about t3 and with $V_{I\_LIMIT}$ substantially in accordance with either equation (12) in buck mode or equation (13) in boost mode. The CLK signal and the $V_{I\_LIMIT}$, $V_{IO\_MAX}$, $V_{COMP}$ and $V_{ISEN}$ voltages are plotted versus time. $V_{I\_LIMIT}$ is shown having a repeating form between CLK cycles similar to that shown in FIG. 13 or FIG. 14 rather than the fixed form (e.g., $V_{I\_LIMIT(FIXED)}$) as shown in FIG. 12.

Operation is similar up to time t3 with onset of the step increase of the output load. The $V_{ISEN}$ voltage indicative of inductor current rises, but is terminated earlier in the cycle at time t4 when it reaches $V_{I\_LIMIT}$ ramping down. The $V_{ISEN}$ voltage reverses and ramps down until time t5 with the next pulse of CLK, and then ramps up again. At time t6, $V_{ISEN}$ again intersects $V_{I\_LIMIT}$ ramping down and reverses to ramp down again. At the next pulse of CLK at time t7, $V_{ISEN}$ begins rising again. Operation repeats in similar manner as shown while $V_{COMP}$ remains above $V_{I\_LIMIT}$, in which $V_{ISEN}$ rises with each pulse of CLK and falls when intersection the repetitive ramping version of $V_{I\_LIMIT}$. $V_{IO\_MAX}$ is the maximum average inductor current, which equals the maximum output current (corresponding to the maximum load current in steady state operation) in the case of a buck converter.

Figure 16:
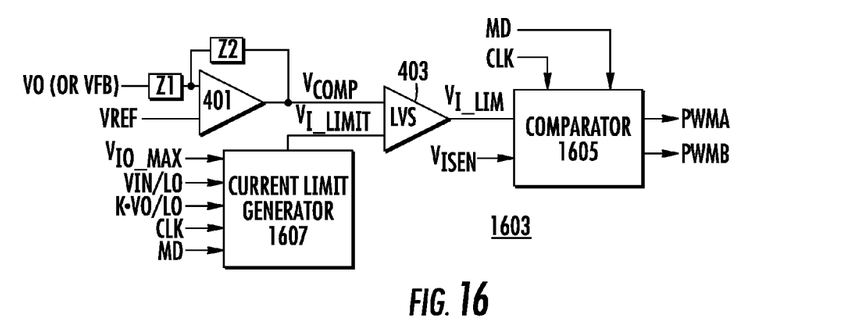
FIG. 16 is a simplified block diagram of a portion of a modulator which replaces the modulator of FIG. 2 for developing the PWMA and PWMB pulse control signals for both buck and boost modes of operation for the converter of FIG. 2 configured as a peak current mode control converter.

FIG. 16 is a simplified block diagram of a portion of a modulator 1603 which replaces the modulator 103 for developing the PWMA and PWMB pulse control signals for both buck and boost modes of operation for the converter 102 configured as a peak current mode control converter. $V_{COMP}$ may be developed in substantially similar manner at the output of the error amplifier 401. The valley current limit generator 407 is replaced by a more general current limit generator 1607 that develops the $V_{I\_LIMIT}$ voltage at its output in accordance with equations (12) or (13) depending upon the mode of operation (buck or boost) as indicated by the mode signal MD. $V_{IO\_MAX}$ and VIN/LO may be provided to respective inputs of the current limit generator 1607. A value K·VO/LO may also be provided, which may be developed in similar manner as VIN/LO previously described. The value K·VO may be VFB or another value indicative of the output voltage VO. Also, CLK and MD may be provided to the current limit generator 1607 at respect inputs. The current limit generator 1607 develops the $V_{I\_LIMIT}$ voltage using substantially similar techniques as previously described for the valley current limit generator 407, in which the $V_{I\_LIMIT}$ voltage is developed according to equation (12) for buck mode and according to equation (13) for boost mode.

The LVS device 403 is provided and receives $V_{COMP}$ and $V_{I\_LIMIT}$ at its inputs and develops a value $V_{I\_LIM}$ at its output. $V_{I\_LIM}$ is the lesser of $V_{COMP}$ and $V_{I\_LIMIT}$ and is provided to a comparator 1605. The comparator 1605 replaces the comparator 405 and may be used to develop the PWMA and PWMB signals for buck and boost modes for the buck-boost converter 102 configured as a peak current mode control converter. As understood by persons with ordinary skill in the art, in peak current controlled current mode converters, current limiting may also be accomplished by limiting the maximum value of the error amplifier's output voltage $V_{COMP}$ instead of using a separate current limit comparator and LVS circuit. The present invention can be implemented also in this case by limiting the maximum value of $V_{COMP}$ to $V_{I\_LIMIT\_P}$ and adding the negative going ramps of FIG. 13 (in the case of buck) or FIG. 14 (in the case of boost) to the $V_{COMP}$ voltage.

Although the invention is described herein with reference to specific embodiments, it is presented to enable one of ordinary skill in the art to make and use the present invention as provided within the context of a particular application and its requirements. Various modifications and changes can be made as apparent to those of ordinary skill in the art without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A modulator configured to control switching of current through an inductor of a converter according to a current limiting scheme while converting an input voltage to an output voltage, said modulator comprising:
   a current limit generator that is configured to provide a periodic ramping current limit value based on a selected one of the input voltage and output voltage, and further based on an inductance of the inductor, a timing signal, and a predetermined maximum output current of the converter; and
   a comparator network that is configured to provide a switch control signal to control switching of current through the inductor by comparing a current sense value indicative of a current through the inductor with a lesser of a compensation error value and said periodic ramping current limit value.

2. The modulator of claim 1, wherein said current limit generator comprises a valley current limit generator for a boost mode of operation, wherein said valley current limit generator comprises:
   a valley current timing conversion network that is configured to provide said periodic ramping current limit value based on the input voltage, the inductance of the inductor, said timing signal, and a peak current limit of the inductor, wherein said peak current limit is based on said predetermined maximum output current of the converter;
   a peak current conversion network that is configured to provide a peak current limit value based on a ratio of the output voltage to the input voltage, said predetermined maximum output current, and a peak-to-peak ripple current through the inductor; and
   wherein said peak current limit value is indicative of said peak current limit of the inductor and is used to develop said periodic ramping current limit value as a valley current limit value.

3. The modulator of claim 2, wherein said peak current conversion network comprises:
   a first combiner that is configured to multiply a gain value by a peak-to-peak ripple value indicative of said peak-to-peak ripple current and to provide a first value indicative thereof;
   a second combiner that is configured to multiply a ratio value indicative of said ratio of the output voltage to the input voltage by a maximum current value indicative of said predetermined maximum output current to provide a second value indicative thereof; and
   a third combiner that is configured to add said first and second values to provide said peak current limit value.

4. The modulator of claim 2, further comprising a ratio conversion network, comprising:
   a ramp generator that is configured to develop a periodic ramp signal based on the input voltage and said timing signal;
   a comparator that is configured to compare said periodic ramp signal with an output value indicative of the output voltage and to provide a duty cycle signal indicative thereof; and a filter that is configured to convert said duty cycle signal into a ratio value indicative of said ratio of the output voltage to the input voltage.

5. The modulator of claim 4, wherein said periodic ramp signal represents inductor current when the inductor is coupled between the input voltage and a supply reference voltage.

6. The modulator of claim 2, further comprising a ripple conversion network, comprising:
   an amplifier that is configured to divide a value indicative of the input voltage by a value indicative of an inductance of the inductor to provide a ripple value;
   a switch circuit that is configured to toggle said ripple value using said switch control signal to develop a duty cycle signal indicative of the peak-to-peak ripple current through the inductor; and
   a filter that is configured to convert said duty cycle signal into said peak-to-peak ripple value.

7. The modulator of claim 2, wherein said valley current timing conversion network comprises:
   a timing circuit that is configured to convert said timing signal into a periodic ramp signal having a peak level based on a switching period of said timing signal;
   a first combiner that is configured to multiply said periodic ramp signal by a ratio value indicative of said ratio of the output voltage to an inductance of the inductor to provide a first value indicative thereof; and
   a second combiner that is configured to subtract said first value from a peak current limit value indicative of said peak current limit of the inductor to provide said periodic ramping current limit value.

8. The modulator of claim 1, further comprising:
   an error amplifier that is configured to provide said compensation error value indicative of an error of the output voltage; and
   a lesser selection device that is configured to determine the lesser of said compensation error value and said periodic ramping current limit value and to provide a selected current limit value indicative thereof.

9. The modulator of claim 1, wherein the converter is configured to operate as a peak current mode controlled boost converter, and wherein said current limit generator is configured to provide said periodic ramping current limit value based on the input voltage, the inductance of the inductor, said timing signal, and said predetermined maximum output current of the converter.

10. The modulator of claim 1, wherein the converter is configured to operate as a peak current mode control buck converter, and wherein said current limit generator is configured to provide said periodic ramping current limit value based on the output voltage, the inductance of the inductor, said timing signal, and said predetermined maximum output current of the converter.

11. An electronic device, comprising:
   a converter, comprising:
      an inductor;
      a switch circuit, coupled to said inductor, that is configured to switch current through said inductor to convert an input voltage to an output voltage as controlled by a first switch control signal; and
      a modulator configured according to a current limiting scheme, comprising:
         a current limit generator that is configured to provide a periodic ramping current limit value based on a selected one of an input value indicative of said input voltage and an output value indicative of said output voltage, and further based on an inductance of said inductor, a clock signal, and a predetermined maximum output current of said converter; and
         a comparator network that is configured to provide said first switch control signal by comparing a current sense value indicative of a current through said inductor with a lesser of a compensation error value and said periodic ramping current limit value.

12. The electronic device of claim 11, further comprising a processor and a memory coupled to said converter.

13. The electronic device of claim 11, wherein said current limit generator comprises a valley current limit generator for a boost mode of operation, wherein said valley current limit generator comprises:
   a valley current timing conversion network that is configured to provide said periodic ramping current limit value based on said input value, the inductance of said inductor, said timing signal, and a peak current limit of said inductor, wherein said peak current limit is based on said predetermined maximum output current of said converter;
   a peak current conversion network that is configured to provide said peak current limit value based on a ratio of said output voltage to said input voltage, said predetermined maximum output current, and a peak-to-peak ripple value indicative of a peak-to-peak ripple current through said inductor.

14. The electronic device of claim 13, further comprising a conversion network that is configured to compare said output value indicative of said output voltage with a ramp signal indicative of said input voltage between cycles of said clock signal to develop a periodic ratio signal, and that is configured to average said periodic ratio signal to provide a ratio value indicative of said ratio of said output voltage to said input voltage.

15. The electronic device of claim 13, further comprising a conversion network that is configured to amplify a value indicative of said input voltage by a gain indicative of the inductance of said inductor to provide a ripple value, that is configured to toggle said ripple value by said first switch control signal to develop a periodic ripple signal, and that is configured to average said periodic ripple signal to provide said peak-to-peak ripple value.

16. The electronic device of claim 11, wherein said converter is configured to operate as a peak current mode control boost converter, and wherein said current limit generator is configured to provide said periodic ramping current limit value based on said input value, the inductance of said inductor, said timing signal, and said predetermined maximum output current of said converter.

17. The electronic device of claim 1, wherein said converter is configured to operate as a peak current mode control buck converter, and wherein said current limit generator is configured to provide said periodic ramping current limit value based on said output value, the inductance of said inductor, said timing signal, and said predetermined maximum output current of said converter.

18. A method configured to limit current through an inductor of a current controlled converter that converts an input voltage to an output voltage, said method comprising:
   receiving a current sense value indicative of current through the inductor;
   receiving a compensation value indicative of an error of the output voltage;
   developing a periodic ramping current limit value based on a selected one of the output voltage and the input voltage, and further based on an inductance of the inductor, a clock signal, and a predetermined maximum output current of the converter;

determining a lesser of the compensation value and the periodic ramping current limit value to provide a selected current limit value; and providing a switch control signal to control switching of current through the inductor using the clock signal and by comparing the selected current limit value with the current sense value.

19. The method of claim 18, wherein said developing a periodic ramping valley current limit value comprises developing the periodic ramping valley current limit value based on the input voltage, the inductance of the inductor, the timing signal, and the predetermined maximum output current of the converter.

20. The method of claim 18, wherein said developing a periodic ramping valley current limit value comprises developing the periodic ramping valley current limit value based on the output voltage, the inductance of the inductor, the timing signal, and the predetermined maximum output current of the converter.

* * * * *